March 5, 1963 S. S. RICKLEY 3,080,199
INTEGRAL BEARING MOUNTING AND DISMOUNTING MEANS
Filed Sept. 1, 1961 3 Sheets-Sheet 1

INVENTOR.
Samuel S. Rickley
BY
Russell, Chittick & Pfund
Attorneys

March 5, 1963  S. S. RICKLEY  3,080,199
INTEGRAL BEARING MOUNTING AND DISMOUNTING MEANS
Filed Sept. 1, 1961  3 Sheets-Sheet 2

INVENTOR.
Samuel S. Rickley
BY
Russell, Chittick & Pfund
Attorneys

March 5, 1963  S. S. RICKLEY  3,080,199
INTEGRAL BEARING MOUNTING AND DISMOUNTING MEANS
Filed Sept. 1, 1961  3 Sheets-Sheet 3

INVENTOR.
Samuel S. Rickley
BY
Russell, Chittick & Pfund
Attorneys

United States Patent Office 3,080,199
Patented Mar. 5, 1963

3,080,199
INTEGRAL BEARING MOUNTING AND
DISMOUNTING MEANS
Samuel S. Rickley, West Boylston, Mass., assignor to
Morgan Construction Company, Worcester, Mass., a
corporation of Massachusetts
Filed Sept. 1, 1961, Ser. No. 135,613
8 Claims. (Cl. 308—207)

This invention relates to means for mounting or dismounting a bearing on the tapered roll neck of a roll of the type used in a rolling mill. The invention is so arranged that the mounting, dismounting and holding devices are preferably in the form of a single unitary structure which is applied to and removed from the roll neck as a unit.

For many years past, various types of bearings have been used in supporting the rolls of rolling mills. One form is the oil-film bearing shown and described in the patent to Dahlstrom, No. 2,018,055. Another is illustrated in the patent to Morgan et al., No. 2,654,642, in which the lubricant is water. Other types are ball or roller bearings. The present invention, however, is of general applicability, not being limited to any particular type of bearing. The rolls may have either cylindrical or tapered roll necks at each end thereof, the necks being placed in and carried by the bearing structure. In the form illustrated herein, the bearing structure comprises an internally tapered sleeve dimensioned to fit tightly on the corresponding tapered roll neck. This sleeve is keyed to the roll neck and rotates with the roll. The outer surface of the sleeve is cylindrical and provides the bearing surface which cooperates with the interior cylindrical surface of the bushing which fits in the surrounding chock which is mounted in the roll housing. The chock ordinarily is fitted with a separable bearing bushing, and oil under pressure is forced or flooded hydrodynamically between the sleeve and the bushing surface. The rotating sleeve thus rides on an oil film which results in low frictional resistance to rotation of the roll and long wear of the bearing parts.

In the art of rolling ferrous metals through the use of cooperating rolls appropriately mounted in the roll stands, it is necessary to change rolls after relatively short periods of use due to wear of the roll surfaces or a change in the dimensions of the required finished product. When rolls are changed, it is customary to remove the roll and its bearings as a unit, after which the two bearings are removed from the two roll necks. The bearings may then be applied to another roll which is to be installed in the frame.

One of the problems present in this sequence of operations is the matter of freeing the internally tapered sleeve from the tapered roll neck after the roll has been removed from the frame. The engaging surfaces of these two parts are of substantial area and because of the relatively slight taper and very accurate fit a considerable force applied axially of the sleeve is necessary to free the sleeve so that the bearing elements may be removed from the roll.

Accordingly, one of the objects of this invention is to provide an integral bearing structure which includes means designed to function in cooperation with an extension of the roll neck whereby the sleeve of the bearing may be forced tightly on the tapered roll neck when the bearing is initially applied thereto and to act in reverse manner when the bearing is to be removed from the roll neck whereby the sleeve is pulled away from its tight engagement with the roll neck.

Another object of the invention is to provide means integral with the bearing for effecting not only removal of the sleeve and bearing chock but also other related structure, such as a thrust bearing, which may be included as part thereof.

Another object of the invention is to provide force-applying means for mounting and dismounting of the bearing in the form of cooperating threaded elements, one of which is a threaded sleeve that is removably mounted on an extension of the roll neck and the other a cooperating nut which when rotated on the threaded sleeve in one direction acts against the bearing parts to force the sleeve on the roll neck and when rotated in the opposite direction acts on another set of structural elements to produce a force acting on the sleeve in the opposite direction thereby to dislodge the sleeve from the roll neck.

A further object is to provide an arrangement in which all of the parts constitute a normally inseparable assembly which is adapted to be placed on the roll neck, and removed therefrom as a single operative unit.

These and other objects of the invention will become more apparent as the description proceeds with the aid of the accompanying drawings in which:

FIG. 5 is a perspective view of the clamping ring and key, which elements together act to maintain the threaded ring in position on the roll neck extension; and FIG. 6 is an enlarged fragmentary view showing the arrangement of the parts at the time the clamping ring is placed in position.

Figure 1:
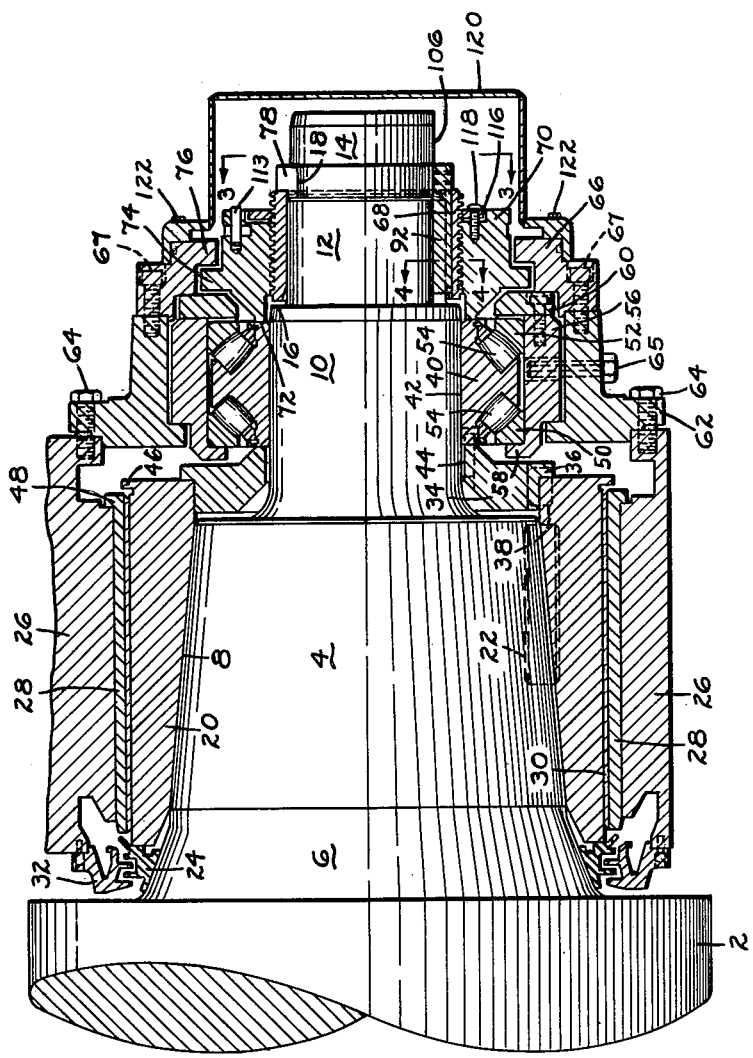
FIG. 1 is a vertical section of the bearing and related structure shown in position on one of the roll necks of a roll.

Referring first to FIG. 1, one end of a roll 2 is shown from which extends roll neck 4 having a transition portion 6. The outer surface 8 of the roll neck 4 is tapered in the form of a truncated cone. Extending from roll neck 4 is an extension 10 which continues outwardly away from the roll with an integral portion 12 of somewhat less diameter. The extension has a terminal end 14 preferably of slightly less diameter than extension 12 to facilitate mounting and dismounting of the unit. Between extension portions 10 and 12 is a circular shoulder 16. Extensions 10 and 12 are cylindrical and coaxial. Between extension 12 and end 14 is a circumferential groove 18 coaxial with the extensions.

In FIG. 1, the bearing and related structure is shown mounted on the roll neck and extensions in normal operating position. The bearing comprises a sleeve 20 that fits exactly on roll neck surface 8. The sleeve is secured against rotation on the roll neck by a key 22 fitting in corresponding keyways in the sleeve and roll neck. At the inner end of the sleeve is a neck seal 24 which is mounted on the transition portion 6 and rotates with the sleeve. Surrounding the sleeve is a stationary chock 26 lined with a bushing 28. The interior of the bushing supports the sleeve along the bearing surfaces as at 30, which cylindrical area is filled with oil to provide the necessary anti-friction and load-carrying characteristics.

Affixed to the inner end of chock 26 is a circular element 32 designed to cooperate with the neck seal 24 so that cooling water and other foreign material cannot get into the bearing surfaces 30. Element 32 assists in removal of seal 24 from the transition portion of the roll neck.

At the outer end of sleeve 20 is a sleeve ring 34 which fits snugly within the end of the sleeve and has a flange 36 overlying the outer end of the sleeve. The sleeve ring 34 is keyed to sleeve 20 by a key 38. Sleeve ring 34 is slidable on extension 10 and has its outer end abutting the end of inner race 40 of a thrust bearing generally referred to at 42. Sleeve 34 in turn is keyed to inner race 40 by a key 44 residing in aligned keyways in the respective parts.

From the structure described thus far, it is believed clear that as roll neck 4 rotates the sleeve 20, sleeve ring 34 and inner race 40 of the thrust bearings are compelled to rotate therewith.

The outer end of sleeve 20 has a radially extending circumferential flange 46 of such dimension as to overlap the outer end of bushing 28. Likewise bushing 28 has an outwardly extending circumferential flange 48 which overlaps a portion of the outer end of chock 26. Thus it can be seen that if the chock and bushing are moved to the right with respect to sleeve 20, as viewed in FIG. 1, the bushing will promptly make engagement with flange 46.

The thrust bearing 42 comprises the following elements: the inner race 40 already referred to; two separate outer races 50 and 52; and a plurality of roller bearings therebetween indicated at 54. The outer races 50 and 52 are held in position by a surrounding roller bearing housing 56 which has an inwardly turned flange 58 on its inner end and a bolted-on roller bearing end plate 60 on its outer end.

The sleeve 20 and thrust bearings 42 are enclosed in a water-tight structure which comprises the chock 26 and a chock end plate 62 which is bolted to the outer end of the chock by a plurality of cap screws 64. To the other end of chock end plate 62 is bolted an outer end plate 66 by a plurality of cap screws 67. An oil pipe 65 for feeding oil to the thrust bearing 42 runs through the chock end plate 62 and the roller bearing housing 56.

On the extension 12 is a one-piece threaded ring 68 whose length is slightly less than the distance from shoulder 16 to the inner edge of groove 18. Mounted in cooperating threaded relationship with ring 68 is a nut 70 which has an inner circular abutment 72 adapted to engage the outer end of race 40. Nut 70 also has a strong outwardly extending circumferential flange 74 which is positioned between the roller bearing end plate 60 and an inwardly turned flange 76 on the outer end of end plate 66.

In order to limit movement of threaded ring 68 on extension 12 there is provided a clamp ring 78 shown in detailed perspective in FIG. 5. This clamp ring, when in operative position, is located in the groove 18, its dimensions being such that there is substantially no end play within the groove.

As can be seen in FIG. 5, the clamp ring 78 comprises two generally semi-circular halves 80 and 82 whose curvature is such that they will lie closely against the bottom surface of groove 18. Each of the semi-circular parts 80 and 82 terminates in a tongue 84 and 86 respectively. Tongue 84 is positioned between a pair of ears 88 and tongue 86 between another pair of ears 90. These ears are integral with a key 92. The tongues 84 and 86 are pivotally affixed to the ears by pins 94 and 96.

On the inner side surface of the halves 80 and 82 is a circumferential notch 98. The circular bottom wall of this notch when the clamping ring 78 is in position (see FIG. 6) in groove 18 is slightly less than the internal diameter of threaded ring 68.

During initial installation of the structure, the threaded ring 68, with nut 70 in place, is as shown in FIG. 6 with its inner end against or close to shoulder 16. Its outer end as at 100 is clear of the inner wall of groove 18. Threaded ring 68 also has a longitudinally extending keyway 102 which is aligned with keyway 104 in extension 12 so that the key 92 may be inserted therein. The under side of the terminal end 14 as viewed in FIGS. 1, 2 and 3 has been cut away to produce a flat area 106 whereby the key 92 may be introduced to lock threaded ring 68 against rotation on extension 12.

To slide the key 92 into position, it is necessary first to swing the halves 80 and 82 of clamp ring 78 far enough apart to clear the outer surface of terminal end 14. With the key 92 in position, the halves 80 and 82 come into alignment with groove 18, permitting halves 80 and 82 to be swung together to fit snugly within groove 18. This situation is illustrated in FIG. 6. Thereafter when the threaded ring 68 is moved to the right as viewed in FIGS. 1 and 2, the end of the ring will then reside in notch 98 thereby locking clamping ring 78 in position in groove 18.

From the description thus far, it is believed clear that the entire bearing structure as shown in FIG. 1, starting with the threaded ring 68 and running through the nut 70, inner race 40, sleeve ring 34, sleeve 20 and neck seal 24, will rotate with the roll neck. On the other hand, the chock 26, seal end plate 32, chock end plate 62, outer end plate 66 and roller bearing housing 56 will remain stationary.

Figure 2:
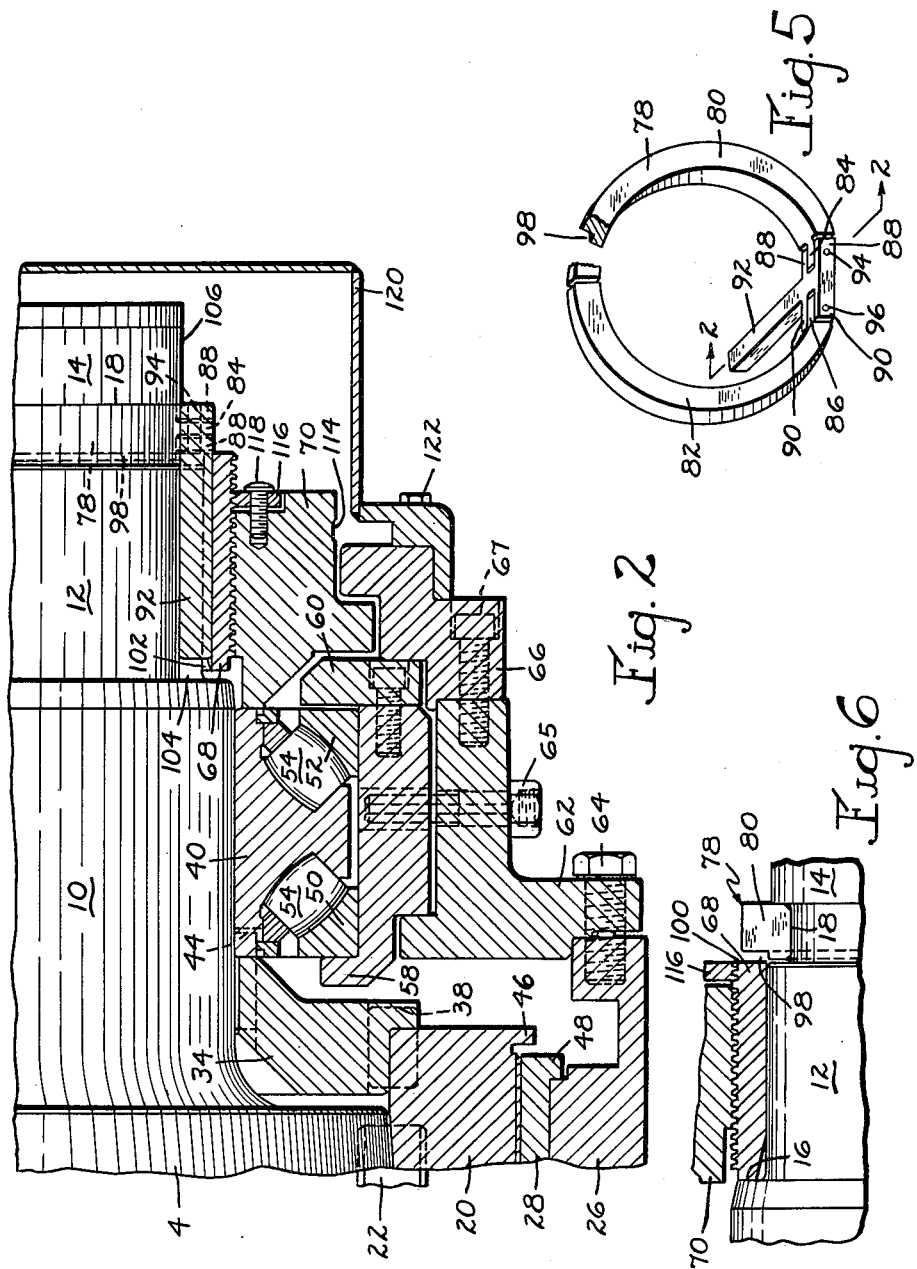
FIG. 2 is an enlarged view of the lower righthand portion of FIG. 1.

When threaded ring 68 has been backed off to the position shown in FIGS. 1 and 2 by rotation of nut 70, which engages the outer end of inner race 40, the outer end of threaded ring 68 comes into engagement with the radial wall of notch 98 of clamp ring 78. The threaded ring 68 therefore provides a fixed member on extension 12 about which nut 70 can be further rotated to provide a compressive force acting through inner race 40, sleeve ring 34 and the flange 36 to drive sleeve 20 toward roll 2. It is obvious that by providing sufficient rotative force on nut 70 the sleeve 20 can be positioned as tightly as necessary on the roll neck 4.

Conversely, if nut 70 is rotated in the opposite direction, the flange 74 will soon come into engagement with flange 76 of the outer end plate 66. As rotation of nut 70 is continued, threaded ring 68 will move to the left to the position shown in FIG. 6 with the left end abutting shoulder 16. Thereafter as nut 70 is rotated further, tension forces will be set up in the outer end plate 66, the chock end plate 62 and chock 26, causing the chock to shift to the right until the flange 48 on bushing 28 engages flange 46 on the righthand end of sleeve 20. Continued rotation of nut 70 will cause the nut to move to the right as viewed in FIG. 1, and this in turn will cause dislodgement of sleeve 20 from its tight position on roll neck 4.

With threaded ring 68 in the position shown in FIG. 6, clamping ring 78 can be opened and the key 92 removed. Then the entire bearing structure may be slid off the roll neck and extensions 10 and 12. Threaded ring 68, having a somewhat larger internal diameter than terminal end 14, can slide readily thereover. Inner race 40 and sleeve ring 34 likewise will readily slide off extension 10 so that the entire structure may be removed.

Figure 3:
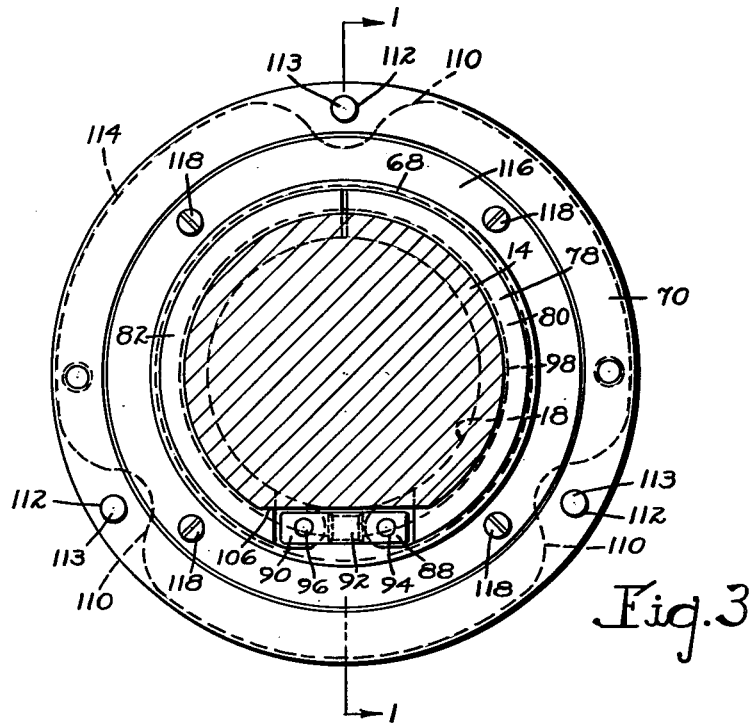
FIG. 3 is a vertical section taken on the line 3—3 of FIG. 1 but drawn to enlarged scale.
Figure 4:
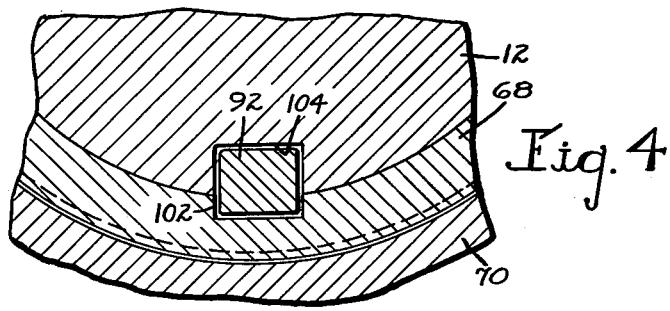
FIG. 4 is a vertical section taken on the line 4—4 of FIG. 1 but drawn to a considerably enlarged scale.

Obviously it is necessary to provide some means for conveniently compelling rotation of nut 70, and this is done in the manner illustrated in FIGS. 1 and 3. The outer periphery of nut 70 has three cut-away areas indicated at 110 and spaced 120 degrees apart. Holes 112 are drilled through the walls so that pins 113 may be inserted therein. To one of these pins is attached a cable which is wrapped for one or more turns around the nut 70 and lies in the circumferential groove 114 on the outer surface of the nut. The end of the cable in common practice is then connected to the hoist of a crane and as the cable is raised the weight of the roll and related bearing parts is such that the nut is compelled to rotate. By reversing the direction of the cable, the nut can be rotated in the opposite direction. In either case, the rotative forces supplied in this easily applied manner are sufficient to first force the sleeve 20 on the roll neck with sufficient tightness and in the second instance are capable of exerting tension forces through the outer stationary elements to cause dislodgement of sleeve 20 from the roll neck.

To prevent loosening of nut 70 during operation of the roll, the nut is locked in position by means of a circular check nut 116 which is in the form of an annular ring threaded on its interior to engage the threads of threaded ring 68 and is held in position to rotate with nut 70 by a plurality of screws 118 spaced about its circumference (see FIG. 3). Since the check nut 116 is normally spaced slightly from the wall of the recess in which it resides in nut 70, upon tightening up of the screws 118 a wedging effect against the threads is produced which is adequate to prevent any subsequent rotation of nut 70 with respect to threaded ring 68.

With the bearing in proper position, the outer end is closed by the use of an end cover 120 which may be secured to the outer end plate 66 by a plurality of screws 122. With the end cover in place, it is obvious that the bearing is completely sealed against the entrance of water to the bearing surfaces 30 or to the thrust bearing 42.

It is my intention to cover all changes and modifications of the examples of the invention herein chosen for purposes of the disclosure which do not constitute departures from the spirit and scope of the invention.

I claim:

1. In combination with a roll having a roll neck and an axial extension, means for mounting and dismounting a bearing which comprises an inner rotatable sleeve on the said roll neck and a non-rotating chock on the said sleeve, a threaded ring removably positioned on said extension, removable means securing said ring to said extension, a nut on said ring, means acting in compression between said sleeve and nut and engageable by said nut whereby when said nut is screwed along said threaded ring toward said roll said nut will force said sleeve onto said roll neck and into tight engagement therewith, means acting in tension between said chock and nut and engageable by said nut whereby when said nut is screwed away from said roll neck said chock will be moved away from said roll, and means on said sleeve engageable by said chock as the latter moves away from said roll thereby to free said sleeve from its tight engagement with said roll neck; said threaded ring, nut, sleeve, chock and associated means removable as a unit from said roll neck and extension after said removable means for securing said ring to said extension has been removed.

2. The combination set forth in claim 1, the means for securing said threaded ring on said extension comprising a groove in said extension located adjacent the outer end of said threaded ring, a removable clamping ring in said groove engaging the outer end of said threaded ring as said threaded ring is moved away from said roll, and means on said clamping ring underlying the outer end of said threaded ring when the latter has moved axially into engagement with said clamping ring, whereby removal of said clamping ring is prevented.

3. The combination set forth in claim 1, the means for securing said threaded ring on said extension comprising a groove in said extension located adjacent the outer end of said threaded ring, a removable clamping ring in said groove to engage the outer end of said threaded ring as said threaded ring is moved away from said roll, means on said clamping ring underlying the outer end of said threaded ring when the latter has moved axially into engagement with said clamping ring whereby removal of said clamping ring is prevented, and a key for keying said threaded ring to said extension to prevent relative rotation.

4. The combination set forth in claim 1, the means acting in compression between said sleeve and said nut comprising a sleeve ring on said extension overlying the end of said sleeve and an inner race of a thrust bearing located on said extension between said sleeve ring and nut.

5. In combination with a roll having a roll neck and an axial extension, means for mounting and dismounting a bearing which comprises an inner rotatable sleeve on the said roll neck and a non-rotating chock on the said sleeve, an externally threaded ring axially slidable on said extension, a removable key for preventing rotation of said ring on said extension, removable means co-acting between said threaded ring and said extension and acting as a stop to limit movement of said ring away from said roll neck, a second stop means for limiting movement of said threaded ring toward said roll neck, a nut on said threaded ring, means between said nut and sleeve for transmitting an axially-directed pushing force to said sleeve applied by said nut when said nut is rotated to move toward said roll neck, means for transmitting an axially-directed pulling force to said chock applied by said nut when said nut is rotated to move away from said roll neck, and means associated with said chock for engaging said sleeve to free said sleeve from said roll neck under the influence of said pulling force.

6. In combination with a roll having a roll neck and an axial extension, means for mounting and dismounting a bearing which comprises an inner rotatable sleeve on the said roll neck and a non-rotating chock on the said sleeve, said sleeve keyed to said roll neck, said chock surrounding said sleeve with a bearing surface therebetween, cooperating means on said chock and sleeve for compelling movement of said sleeve away from said roll when said chock is moved away from said roll, a threaded ring on said extension removably affixed thereto, a nut on said ring, means engageable by said nut when said nut is moved toward said roll for driving said sleeve onto said roll neck, and other means engageable by said nut when said nut is moved away from said roll for moving said chock away from said roll; said threaded ring, nut, sleeve, chock and associated engageable means removable from said roll neck and extension as a unit.

7. A unitary structure for application to the roll neck and extension thereof of a roll, comprising an externally threaded ring dimensioned to fit on a roll neck extension, a nut on said threaded ring, a sleeve adapted to fit a roll neck and to be rotatable therewith, a non-rotating chock surrounding said sleeve, means between said nut and sleeve for transmitting motion of said nut along said threaded ring to said sleeve, other means connected to said chock and engageable by said nut for transmitting motion of said nut along said threaded ring in the opposite direction to said chock, and means limiting the axial movement of said chock with respect to said sleeve in the direction toward said nut.

8. A unitary structure for application to the roll neck and extension thereof of a roll, said structure comprising a sleeve shaped to fit a roll neck, a chock surrounding said sleeve, a tubular element attached to the outer end of said chock, a nut within said tubular element, a threaded ring within said nut, means for limiting axial movement of said nut with respect to said tubular element in a direction away from said chock whereby said nut may apply a pulling force to said chock through said tubular element when the said threaded ring is held fixed and said nut is rotated in one direction, other means interposed between said nut and said sleeve whereby said nut may apply a pushing force to said sleeve when moved in the direction of said sleeve when said nut is rotated in the other direction on the said fixed threaded ring.

References Cited in the file of this patent
UNITED STATES PATENTS 2,018,055   Dahlstrom _____ Oct. 22, 1935
2,955,002   Rich _____ Oct. 4, 1960